United States Patent [19]

Steinwand

[11] Patent Number: 5,039,764

[45] Date of Patent: Aug. 13, 1991

[54] PROCESS FOR PREPARING CARBOXYLATED COPOLYMERS

[75] Inventor: Paul J. Steinwand, Placentia, Calif.

[73] Assignee: Union Oil Company of California, Los Angeles, Calif.

[21] Appl. No.: 332,626

[22] Filed: Mar. 31, 1989

[51] Int. Cl.$^5$ .................... C08F 2/24; C08F 236/10
[52] U.S. Cl. .................... 526/80; 526/79; 526/87; 526/304; 526/317.1; 526/318.45; 526/318.6; 526/318.25; 524/457; 524/458; 524/534; 524/556; 524/812; 524/813; 524/822
[58] Field of Search .......... 526/80, 304, 318.45, 526/318.25, 317.1, 318.6, 87, 79; 524/813, 812, 822, 457, 458, 534, 556; 525/243

[56] References Cited

U.S. PATENT DOCUMENTS

| | | | |
|---|---|---|---|
| 4,246,156 | 1/1981 | Heins et al. | 526/304 X |
| 4,272,426 | 6/1981 | Feast | 526/80 X |
| 4,522,973 | 6/1985 | Ley et al. | 524/555 |

*Primary Examiner*—Fred Teskin
*Attorney, Agent, or Firm*—Gregory F. Wirzbicki; Michael A. Kondzella

[57] ABSTRACT

An improved wet strength binder is prepared by a process in which interaction between an olefinic carboxylic acid monomer, such as itaconic acid, and a cross-linker, such as MAGME, is minimized.

23 Claims, No Drawings 5,039,764

PROCESS FOR PREPARING CARBOXYLATED COPOLYMERS

FIELD OF THE INVENTION

This invention relates to a copolymerization process. In one of its more particular aspects this invention relates to a process for preparing carboxylated copolymers which can be used in binders for nonwoven fabrics. In another of its more particular aspects, this invention relates to binders prepared by such process which are useful in producing nonwoven fabrics having improved wet strength.

BACKGROUND OF THE INVENTION

During the past few years there has been a substantial growth in the production of high-strength paper and cloth products having a nonwoven, randomly-oriented structure, bonded with a polymeric resin binder. Such products are finding wide use as high-strength, high-absorbency materials for disposable items such as consumer and industrial wipes or towels, diapers, surgical packs and gowns, industrial work clothing and feminine hygiene products. They are also used for durable products such as carpet and rug backings, apparel interlinings, automotive components and home furnishings, and for civil engineering materials such as road underlays. There are several ways to apply a binder to these materials including spraying, print binding, and foam application. Further, depending on the end use, various ingredients such as catalysts, cross-linkers, surfactants, thickeners, dyes, and flame retardant salts may also be incorporated into the binder.

In the high-speed, high-volume manufacture of cellulosic products such as wet wipes, an important binder property is a fast cure rate; i.e., the finished product must reach substantially full tensile strength in a very short time after binder application so that production rates are not unduly slowed down. In these products, such a property is usually obtained by using a binder which is either self cross-linkable or by incorporating an external cross-linker into the binder formulation. The cross-linker or self cross-linkable binder apparently not only interacts with the binder monomers but with the hydroxyl groups on the cellulose fibers as well to quickly form very strong bonds.

The most commonly used binder formulations include copolymers in which one or more of the comonomers is an ethylenically unsaturated mono- or dicarboxylic acid or a derivative thereof. For example, carboxylated styrene-butadiene resin (SBR) copolymers, carboxylated acrylate copolymers and carboxylated vinyl acetate/acrylate copolymers are used extensively as binders for nonwoven cellulosic materials to impart desired strength characteristics.

As the need for stronger nonwovens developed, cross-linking agents for the base binders were utilized. N-methylolacrylamide and other similar cross-linkers were incorporated into the binders. While the strength of the nonwovens increased desirably, it was discovered that many of these cross-linking agents, especially N-methylolacrylamide and similar materials, emitted formaldehyde during use. The toxicity of formaldehyde caused users to search for non-formaldehyde emitting alternatives. One of the non-formaldehyde emitting cross-linkers is methyl acryloamidoglycolate methyl ether (MAGME). However, while MAGME improved the strength of many copolymeric binders and did not emit formaldehyde, it was observed that the use of MAGME with carboxylated copolymers did not produce the increases in strength expected to the same degree as with non-carboxylated copolymers. A way to use MAGME with carboxylated copolymers without sacrificing binder strength was therefore needed.

SUMMARY OF THE INVENTION

In accordance with the present invention, a process for preparing carboxylated copolymers which can be used to provide binders for nonwoven fabrics having improved wet strength is provided. The process comprises polymerizing the combination of monomers utilized in the copolymer in a manner such that interaction of the cross-linking agent with the comonomer providing the carboxylate group to the carboxylated copolymer is minimized. The way in which this is accomplished is by adding the carboxylated comonomer to the polymerization reactor separately from the cross-linking agent. The result is to achieve higher wet strength upon incorporating the cross-linked copolymer into a nonwoven fabric.

DETAILED DESCRIPTION OF THE INVENTION

The present invention comprises a process for preparing a fast curing binder for nonwoven cellulosic materials. The binder comprises the product of copolymerization of a mixture of comonomers including a carboxylated comonomer and a cross-linking comonomer.

The copolymers of the present invention typically comprise carboxylated conjugated diolefin copolymers containing about 10 to about 95 weight percent of one or more alkenyl aromatic monomers, about 5 to about 90 weight percent of 1 or more conjugated diolefins having 4 to about 8 carbon atoms, and about 0.1 to about 5 weight percent of an olefinic carboxylic acid. Illustrative alkenyl aromatic monomers include, for example, styrene, alpha-methylstyrene, p-methylstyrene, chlorostyrene and methyl-bromostyrene. Illustrative conjugated diolefinic monomers include, for example, butadiene and isoprene. Illustrative olefinic carboxylic acids include, for example, acrylic acid, methacrylic acid, itaconic acid, maleic acid, and fumaric acid. The alkenyl aromatic monomer is preferably present in a concentration of about 20 to about 80 weight percent, most preferably about 40 to about 70 weight percent, while the conjugated diolefin monomer is preferably present in a concentration of about 20 to about 80 weight percent, most preferably about 30 to about 60 weight percent, and the olefinic carboxylic acid monomer is preferably present in a concentration of about 0.3 to about 3.0 weight percent, most preferably about 0.5 to about 2.0 weight percent.

The carboxylated copolymers can contain various other monomers in addition to the alkenyl aromatic monomer, the conjugated diolefin monomer and the olefinic carboxylic acid monomer, such as vinyl esters of carboxylic acids, mono-olefins, olefinically unsaturated nitriles, or esters of olefinically unsaturated carboxylic acids.

To impart the fast-curing properties needed for cellulose binder compositions, the mixture of comonomers which polymerize to form a polymeric latex includes a polymerizable cross-linker or other reactive monomer. The most effective prior art cross-linkers commonly used with these latexes are all known formaldehyde emitters, such as N-methylolacrylamide and glyoxal bisacrylamide. However, by using as a cross-linker about ½ percent to about 15 percent, by weight, of one or more low or non-formaldehyde emitting, polymerizable reactive monomers, selected from methyl acryloamidoglycolate, methyl acryloamidoglycolate methyl ether and isobutoxymethyl acrylamide, a zero formaldehyde or low formaldehyde binder can be provided. The resulting binders have wet tensile strengths substantially equivalent or superior to those of prior art formaldehyde emitting binders.

One of the key features of the invention is to introduce the carboxylated comonomer into the reaction zone in which the ultimate copolymer is to be produced separately from the cross-linking agent, e.g., in a liquid or solution separate from that containing the cross-linker. The invention may thus be practiced in many ways. In one embodiment, all the carboxylated comonomer is introduced into the reaction zone prior to the addition of other monomers and the cross-linking agent, the latter ingredients being added subsequently, usually and preferably simultaneously and continuously over a prolonged period of time, e.g., at least about 1 to about 8 hours. In another embodiment, a portion, preferably a substantial portion, of the carboxylated comonomer is introduced into the reaction zone prior to the other monomers and the cross-linking agent, following by the addition of these latter components and the balance of the carboxylated comonomer, such addition, again, usually and preferably occurring simultaneously and continuously over a prolonged period of time. In yet another embodiment which contrasts with the previous two in that there is no initial charge of carboxylated comonomer in the reaction zone, the carboxylated comonomer is introduced continuously into the reaction vessel. Such introduction may occur after all the other ingredients have been added, or after a portion of one or more is introduced, or simultaneously with the introduction of one or more of the other ingredients. Whatever variation is used, however, the carboxylated comonomer is added in a liquid separate from that of the cross-linker and, preferably, this embodiment is practiced by adding all the comonomers and the cross-linker(s) simultaneously and continuously into the reaction zone over a prolonged period of time. In all embodiments of the invention, the carboxylated comonomer is preferably introduced into the reaction zone as an aqueous solution.

The copolymers of the present invention can be prepared by free radical solution and emulsion polymerization methods including batch, continuous and semicontinuous procedures. For the purposes of this invention, free radical polymerization methods are intended to include radiation polymerization techniques. Free-radical polymerization procedures for preparing aqueous polymer emulsions typically involve gradually adding the monomer or monomers to be polymerized simultaneously to an aqueous reaction medium containing a free radical catalyst at rates proportionate to the respective percentage of each monomer in the finished polymer. Optionally, copolymers can be obtained by adding one or more comonomers disproportionately throughout the polymerization so that the portions of the polymers formed during the initial polymerization stage comprise a monomer composition differing from that formed during intermediate or later stages of the same polymerization. For instance, a styrene-butadiene copolymer can be formed by adding a greater proportion or all of the styrene during the initial polymerization stages with the greater proportion of the butadiene being added later in the polymerization.

Illustrative free-radical catalysts which can be used are free radical initiators such as hydrogen peroxide, potassium or ammonium peroxydisulfate, dibenzoyl peroxide, lauroyl peroxide, ditertiarybutyl peroxide, 2,2'-azobisisobutyronitrile, either alone or together with one or more reducing components such as sodium bisulfite, sodium metabisulfite, glucose, ascorbic acid or erythorbic acid. Ultraviolet (UV) and electron beam polymerization methods suitable for initiating free radical polymerization are discussed in the Handbook of Pressure-Sensitive Adhesive Technology, particularly at pages 586–604 and the references cited therein. The foregoing references in their entireties are incorporated herein by reference.

Physical stability of the dispersion usually is achieved by providing in the aqueous reaction medium one or more nonionic, anionic, and/or amphoteric surfactants including copolymerizable surfactants such as sulfonated alkylphenol polyalkyleneoxy maleate, sulfoethyl methacrylate, or alkenyl sulfonates. Illustrative of nonionic surfactants are alkylpolyglycol ethers such as ethoxylation products of lauryl, oleyl, or stearyl alcohols or mixtures of alcohols, such as coconut fatty alcohols; alkylphenol polyglycol ethers such as ethoxylation products of octyl- or nonylphenol, diisopropylphenol, triisopropyl phenol, or di- or tritertiarybutyl phenol. Illustrative of anionic surfactants, for example, are alkali metal or ammonium salts of alkyl, aryl, or alkylaryl sulfonates, sulfates, phosphates or phosphonates. Specific examples include sodium lauryl sulfate, sodium octylphenol glycolether sulfate, sodium dodecylbenzene sulfonate, sodium lauryl diglycol sulfate, ammonium tritertiarybutylphenol penta- and octa-glycol sulfates, dioctyl sodium sulfosuccinate, alpha-olefin sulfonates and sulfonated biphenyl ethers. Numerous other examples of suitable surfactants are disclosed in U.S. Pat. No. 2,600,831, the disclosure of which in its entirety is incorporated herein by reference.

Those skilled in the art of emulsion polymers will appreciate that protective colloids, fillers, extenders, colorants, tackifiers, and other additives which are compatible with the polymer emulsion can be added, if desired.

The polymerization reaction is typically conducted with agitation at a temperature sufficient to maintain an adequate reaction rate until most of the monomers are consumed. Temperatures of about 120° to about 190° F. are generally used. Temperatures of about 150° to about 170° F. are preferred. Monomer addition is usually continued until the latex reaches a polymer concentration of about 20 to about 70 weight percent and preferably about 40 to about 50 weight percent.

A chain transfer agent may be added to the reaction mixture where it is desired to produce a lower molecular weight copolymer. Examples of chain transfer agents, which are typically added in amounts of about 0.1 to about 5 percent by weight of monomers, are organic halides such as carbon tetrachloride and tetrabromide, alkyl mercaptans, such as secondary and tertiary butyl mercaptan, and thiol substituted polyhydroxyl alcohols, such as monothiolglycerine.

The preparation of the carboxylated copolymers of the present invention differs from previous preparation methods in that, whereas previously the comonomers used had generally been mixed in an aqueous solution to which the crosslinking agent was added, in the present invention, the carboxylated comonomer is added separately from the other comonomers and the cross-linking agent. Although the present invention should not be limited by any theoretical explanation, it is believed that, since the carboxylated comonomer is a stronger acid than the copolymer containing the polymerized carboxylated comonomer, undesired interaction between the cross-linker and the carboxylated comonomer is greater prior to polymerization of the carboxylated comonomer. It is essential in the present invention, therefore, that contact between the carboxylated comonomer and the cross-linker be kept to a minimum.

In an especially preferred embodiment of the present invention an aqueous emulsion copolymer latex comprised of styrene, butadiene and itaconic acid is prepared as follows. The itaconic acid is dissolved in water and charged, together with a surfactant and a polystyrene seed polymer, to a reaction vessel. The aqueous mixture is then heated to a reaction temperature of about 120° F. to about 150° F. and a free radical polymerization catalyst is added. The simultaneous addition of styrene, butadiene, a chain transfer agent, additional surfactant and an aqueous solution of methylacryloamidoglycolate methyl ether (MAGME) cross-linker is then begun and continued over a period of about 1 hour to about 8 hours, following which the temperature is raised to about 150° F. to about 190° F. for about another 1 hour to about 6 hours. The resulting copolymer emulsion is then recovered and the pH value of the emulsion is adjusted to about pH 7.0. The polymer emulsion can then be used, for example, as a binder for nonwoven cellulosic materials with exceptional results.

The manner in which the process of the present invention is conducted results in minimizing undesired reaction between itaconic acid and MAGME in the following ways 1. itaconic acid and MAGME are kept separate before addition to the polymerization reactor;
2. itaconic acid is added to the reactor as an aqueous solution;
3. MAGME is added to the reactor containing catalyst and itaconic acid solution at the same time as the styrene and butadiene and over a prolonged period of time. Since the styrene, butadiene and itaconic acid will begin to copolymerize immediately upon mixing the styrene and butadiene with the catalyst, the opportunity for reaction of the MAGME with unpolymerized itaconic acid is minimized.

The invention is further described by the following examples which are illustrative of specific modes of practicing the invention and are not intended as limiting the scope of the invention as defined in the claims. All percentages are by weight unless otherwise specified.

EXAMPLE 1

A styrene-butadiene-itaconic acid copolymer was prepared by adding to a pressure reactor with constant stirring 29.1 parts water, 1.0 parts itaconic acid, 0.5 parts of a 10 percent solution of Aerosol A-196 surfactant (sodium dicyclohexyl sulfosuccinate, available from American Cyanamid Co., Wayne, N.J.), and 0.5 parts of a polystyrene seed, 25 nm particle size. The mixture was heated to 150° F. and 0.2 parts sodium persulfate in 2.7 parts water was added to initiate the reaction.

The following four streams were then added simultaneously and continuously over a 6 hour period:
(1) 36 parts butadiene;
(2) 64 parts styrene;
(3) 0.5 parts sodium persulfate dissolved in 9.5 parts water;
(4) 5 parts MAGME-100 (methyl acryloamidoglycolate methyl ether, available from American Cyanamid Co., Wayne, N.J.), 0.03 parts Versene 100 (sodium ethylenediamine tetraacetate, available from Dow Chemical Co., Midland, Mich.) and an additional 1.5 parts Aerosol A-196 as a 10 percent solution, dissolved in 38.3 parts water.

During the first 3 hours of the 6 hour addition period, 0.5 parts Sulfole 120 mercaptan (tertiary dodecyl mercaptan, available from Phillips Chemical Co., a subsidiary of Phillips Petroleum Co., Bartlesville, Okla.) was dissolved in the styrene.

The final mixture was heated to a temperature of 170° F. for 5 hours. The resulting emulsion polymer was cooled and removed from the reactor. It had a pH value of 2.2, which was adjusted to pH 7.0 with ammonium hydroxide. Total solids were 49.6 percent. The particle size was 162 nm.

The wet tensile strength was determined as follows. Sets of one-inch wide, nonwoven, randomly-oriented cellulose strips were padded in the binder composition to obtain a binder add-on of approximately 10 percent. Padding is the process of dipping or saturating a substrate in a bath and squeezing off the excess liquid with nip rollers. The binder-containing strips were dried at 23° C. and then cured at 188° C. for 6 seconds, and then dipped in a 1 percent solution of Aerosol OT (a sodium octyl sulfosuccinate wetting agent, available from American Cyanamid Co., Wayne, N.J..) The wet tensile strength was measured and found to be 8.8 pounds.

EXAMPLE 2

A latex was prepared as in Example 1 except that the amount of itaconic acid was 0.5 parts instead of 1.0 parts. The resulting latex was tested as in Example 1 and the wet tensile strength was 8.9 pounds.

The following example shows the adverse effect of having itaconic acid and MAGME together rather than separate as in the present invention.

EXAMPLE 3

A latex was prepared as in Example 2 except that an additional 0.5 parts itaconic acid was dissolved in the aqueous solution with the 5 parts MAGME-100 and the 1.5 parts Aerosol A-196. The resulting latex was tested exactly as in Example 1. The wet tensile strength was found to be 8.4 pounds.

Thus, it can be seen that improved wet tensile strength is obtained using the binders of the present invention.

The invention may be embodied in other forms without departing from the spirit or essential characteristics thereof. For example, other latexes than those specifically exemplified herein may be used in practicing the present invention. Consequently, the present embodiments and examples are to be considered only as being illustrative and not restrictive, with the scope of the invention being indicated by the appended claims. All embodiments which come within the scope and equivalency of the claims are, therefore, intended to be embraced therein.

I claim:

1. A process for preparing a binder for imparting high wet strength to nonwoven cellulosic materials which comprises copolymerizing a mixture of an alkenyl aromatic comonomer, a conjugated diolefin comonomer, and olefinic carboxylic acid comonomer and a polymerizable cross-linker, wherein said olefinic carboxylic acid comonomer is charged to a reaction zone in the absence of other polymerizable comonomers and thereafter said alkenyl aromatic comonomer, said conjugated diolefin comonomer and said polymerizable cross-linker are added to said reaction zone essentially continuously over a period of about 1 to about 8 hours.

2. A process for preparing a binder for imparting high wet strength to nonwoven cellulosic materials which comprises polymerizing a mixture of an alkenyl aromatic comonomer, a conjugated diolefin comonomer, an olefinic carboxylic acid comonomer and a polymerizable cross-linker; all of said olefinic carboxylic acid comonomer being charged to a reaction zone without charging any of said alkenyl aromatic comonomer, said conjugated diolefin comonomer and said polymerizable cross-linker; said alkenyl aromatic comonomer, said conjugated diolefin comonomer and said polymerizable cross-linker thereafter being simultaneously charged to said reaction zone.

3. A process according to claim 2 wherein said alkenyl aromatic comonomer, said conjugated diolefin comonomer and said polymerizable cross-linker are charged essentially continuously over a period of about 1 to about 8 hours.

4. A process for preparing a binder for imparting high wet strength to nonwoven cellulosic materials which comprises polymerizing a mixture of an alkenyl aromatic comonomer, a conjugated diolefin comonomer, an olefinic carboxylic acid comonomer and a polymerizable cross-linker; a portion of said olefinic carboxylic acid comonomer being charged to a reaction zone without charging any of said alkenyl aromatic comonomer, said conjugated diolefin comonomer and said polymerizable cross-linker; the balance of said olefinic carboxylic acid comonomer, said alkenyl aromatic comonomer, said conjugated diolefin comonomer and said polymerizable cross-linker thereafter being simultaneously charged to said reaction zone; said balance of said olefinic carboxylic acid comonomer being charged separately from said polymerizable cross-linker.

5. A process according to claim 4 wherein said balance of said olefinic carboxylic acid comonomer, said alkenyl aromatic comonomer, said conjugated diolefin comonomer and said polymerizable cross-linker are charged essentially continuously over a period of about 1 to about 8 hours.

6. A process according to claim 4 wherein said portion of said olefinic carboxylic acid comonomer comprises about 50 percent of the total olefinic carboxylic acid comonomer charged.

7. A process according to one of claims 1–6 wherein said alkenyl aromatic comonomer is a member selected from the group consisting of styrene, alpha-methylstyrene, p-methylstyrene, chlorostyrene and methylbromostyrene.

8. A process according to one of claims 1–6 wherein said alkenyl aromatic comonomer is styrene.

9. A process according to one of claims 1–6 wherein said conjugated diolefin comonomer contains 4 to about 8 carbon atoms.

10. A process according to one of claims 1–6 wherein said conjugated diolefin comonomer is a member selected from the group consisting of butadiene and isoprene.

11. A process according to one of claims 1–6 wherein said conjugated diolefin comonomer is butadiene.

12. A process according to one of claims 1–6 wherein said olefinic carboxylic acid comonomer is a member selected from the group consisting of acrylic acid, methacrylic acid, itaconic acid, maleic acid and fumaric acid.

13. A process according to one of claims 1–6 wherein said olefinic carboxylic acid comonomer is itaconic acid.

14. A process according to one of claims 1–6 wherein said polymerizable cross-linker is a member selected from the group consisting of methyl acryloamidoglycolate, methyl acryloamidoglycolate methyl ether and isobutoxymethyl acrylamide.

15. A process according to one of claims 1–6 wherein said polymerizable cross-linker is methyl acryloamidoglycolate methyl ether.

16. A process according to one of claims 1–6 wherein said mixture contains about 10 to about 95 weight percent of said alkenyl aromatic comonomer, about 5 to about 90 weight percent of said conjugated diolefin comonomer, about 0.1 to about 5 weight percent of said olefinic carboxylic acid comonomer, and about 0.5 to about 15 weight percent of said polymerizable cross-linker.

17. A process according to one of claims 1–6 wherein said mixture contains about 20 to about 80 weight percent of said alkenyl aromatic comonomer, about 20 to about 80 weight percent of said conjugated diolefin comonomer, about 0.3 to about 3 weight percent of said olefinic carboxylic acid comonomer, and about 0.5 to about 15 weight percent of said polymerizable cross-linker.

18. A process according to one of claims 1–6 wherein said mixture contains about 40 to about 70 weight percent of said alkenyl aromatic comonomer, about 30 to about 60 weight percent of said conjugated diolefin comonomer, about 0.5 to about 2 weight percent of said olefinic carboxylic acid comonomer, and about 0.5 to about 15 weight percent of said polymerizable cross-linker.

19. A process according to one of claims 1–6 wherein said mixture additionally contains a member selected from the group consisting of vinyl esters of carboxylic acids, mono-olefins, olefinically unsaturated nitriles and esters of olefinically unsaturated carboxylic acids.

20. A process for preparing an aqueous emulsion polymer which comprises mixing, in a reaction zone, an aqueous solution of itaconic acid, a surfactant and a polystyrene seed polymer, heating the resulting aqueous mixture to a temperature of about 120° F. to about 150° F., adding a free radical polymerization catalyst to said reaction zone, adding styrene, butadiene, a chain transfer agent, additional surfactant and an aqueous solution of methyl acryloamidoglycolate methyl ether to said reaction zone over a period of about 1 to about 8 hours, raising the temperature to about 150° F. to about 190° F. for an additional period of about 1 to about 6 hours and recovering from said reaction zone an aqueous emulsion polymer.

21. A process according to claim 20 wherein the polymerization reaction is conducted at a temperature of about 150° F. to about 170° F.

22. A process according to claim 20 wherein monomer addition is continued until a polymer concentration of about 20 to about 70 weight percent is reached.

23. A process according to claim 20 wherein monomer addition is continued until a polymer concentration of about 40 to about 50 weight percent is reached.

* * * * *